United States Patent [19]

Eigenmann

[11] 4,020,211

[45] * Apr. 26, 1977

[54] ANTI-SKID AND WEAR RESISTANT ROAD SURFACE MARKING MATERIAL

[76] Inventor: Ludwig Eigenmann, Vacallo, Ticino, Switzerland

[ * ] Notice: The portion of the term of this patent subsequent to Jan. 27, 1993, has been disclaimed.

[22] Filed: May 22, 1973

[21] Appl. No.: 362,757

Related U.S. Application Data

[63] Continuation-in-part of Ser. No. 153,218, June 15, 1971, Pat. No. 3,782,843.

[30] Foreign Application Priority Data

May 24, 1972 Italy .................................. 24785/72

[52] U.S. Cl. ............................... 428/323; 350/105; 404/14; 427/137; 428/325; 428/328; 428/329; 428/331; 428/332; 428/425; 428/474; 428/480; 428/483; 428/522

[51] Int. Cl.² ......................... B32B 5/16; E01F 9/00

[58] Field of Search .............. 404/12.9, 19, 14, 20; 161/162; 428/143, 148, 149, 156, 913, 323, 425, 480, 483, 474, 430, 431, 457, 325, 328, 331, 332, 522, 329; 427/137; 350/105

[56] References Cited

UNITED STATES PATENTS

| | | | |
|---|---|---|---|
| 2,865,266 | 12/1958 | Wynn | 404/14 |
| 2,948,201 | 8/1960 | Nagin | 404/14 X |
| 3,005,790 | 10/1961 | Wynn | 404/14 X |
| 3,097,080 | 7/1963 | Weir | 161/162 X |
| 3,324,213 | 6/1967 | Anfinset | 161/162 X |
| 3,334,555 | 8/1967 | Nagin | 404/75 |
| 3,344,011 | 9/1967 | Goozner | 161/162 X |
| 3,399,607 | 9/1968 | Eigenmann | 404/19 |
| 3,419,460 | 12/1968 | Ure | 161/162 |
| 3,527,146 | 9/1970 | Garling | 404/19 |
| 3,764,455 | 10/1973 | Lovell | 161/162 |
| 3,782,843 | 1/1974 | Eigenmann | 404/9 |
| 3,935,365 | 1/1976 | Eigenmann | 428/325 |

FOREIGN PATENTS OR APPLICATIONS

| | | |
|---|---|---|
| 2,097,941 | 3/1972 | France |
| 1,006,294 | 9/1965 | United Kingdom |

Primary Examiner—Ellis Robinson
Attorney, Agent, or Firm—Michael J. Striker

[57] ABSTRACT

The disclosure describes a new material adapted to be laid down and adhesively secured on a road surface to provide a traffic regulating sign thereon, the material having an upper surface exposed to traffic and provided with a plurality of sharp tips projecting above said surface for imparting good non-skid properties thereto, the said new material comprising an upper layer adjacent to said upper surface, at least partially embedding hard particles to form said sharp tips and consisting of a polymeric resin having a high molecular cohesion such as a polyamide resin, a polyurethane resin or a polyterephthalic resin, thereby adding improved wear resistance properties to non-skid and high visibility properties.

16 Claims, 5 Drawing Figures

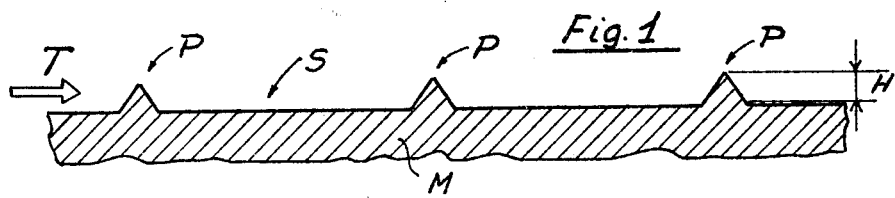
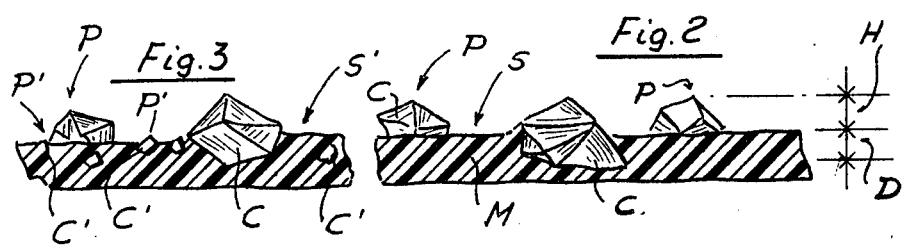
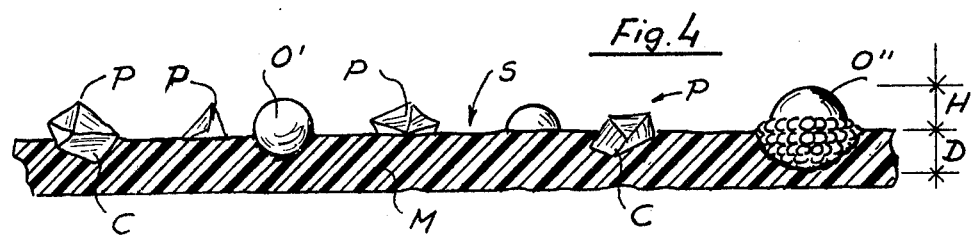
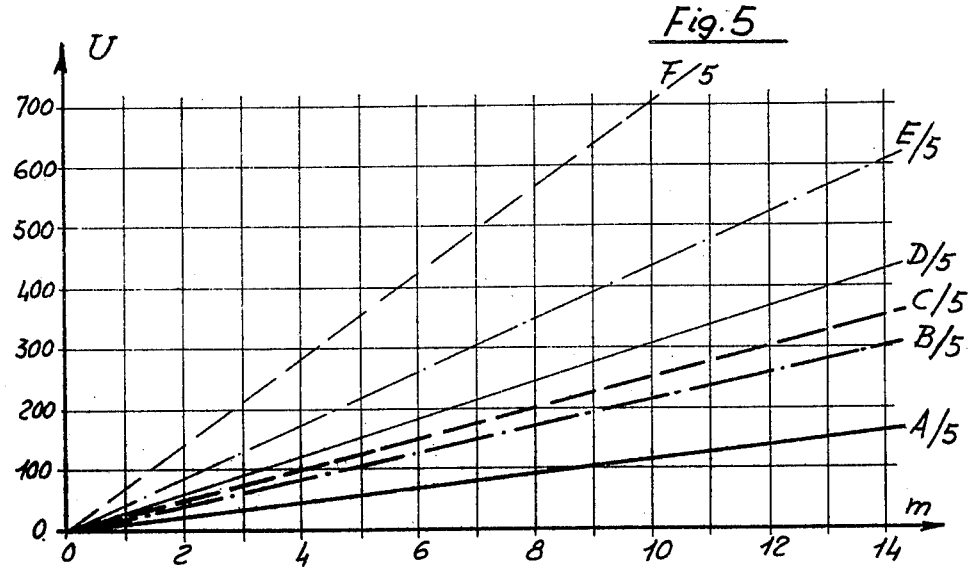

ANTI-SKID AND WEAR RESISTANT ROAD SURFACE MARKING MATERIAL

CROSS-REFERENCE TO RELATED APPLICATION

This application is a continuation-in-part of prior copending application Ser. No. 153,218 filed June 15, 1971 and now U.S. Pat. No. 3,782,843.

BACKGROUND OF THE INVENTION a. The Field of the Invention

This invention relates to the art of marking surfaces which are exposed to mark-obliterating traffic, and more particularly to the provision of traffic lines and other directional data upon the road surface of streets and highways, by applying and securing road marking material on said surface, whereby a marked road is provided.

b. The prior Art

This art is well worked and widely known. The marks, most commonly traffic lines, can be painted on the road surface, formed thereon by applying molten material thereto, or provided thereon by applying the adhesively securing preliminarily manufactured tape material thereto. The thus formed or applied traffic line or other mark will therefore form of itself a part of the road surface and will be correspondingly subjected to the wear and progressively destructive action of traffic, particularly where such traffic includes the passage of fast and/or heavy vehicles.

The problems involved in providing a roadway surface marking material having both high visibility and non-skid properties have been extensively discussed and analyzed in tthe instant Applicant's prior British Pat. Specification No. 1,032,813, Canadian Pat. No. 754,343 and in the U.S. Pat. No. 3,399,607 of the United States of America. In these prior patents it is proposed to provide a compound marking material, the upper or exposed surface of which includes different parts arranged thereon, some of these parts being substantially smooth and suitably pigmented to provide high light reflectivity and, thus, visibility, but having poor non-skid properties, while the remaining parts are formed of a compound having a high content of substantially hard and granulated componenets, such as sand and quartz, to provide fairly good non-skid properites, such latter parts however providing poor visibility and being undesirably receptive to dirt, rubber particles from vehicle tires and so on.

The Applicant has more recently proposed an improved structure of the above road marking materials, such as described and open to public inspection in the French Pat. No. 2,097,941, Belgian Pat. No. 768,577 and in the published German Pat. application No. P 21 30 529.3. According to this more advanced technology, there has been provided a road marking material comprising a base compound of essentially elastomeric nature, including a first binder and having a smooth, substantially planar and highly light-reflective surface adapted to face away from the road surface, a plurality of particles having a hardness substantially higher than 7 on the Mohs' Hardness Scale and each including a lower portion embedded in and securely bonded to said base compound and an upper portion extending outwardly from said surface and comprising a pointed end portion, said pointed end portions being spaced from one another by a substantial distance and imparting good anti-skid properties to said surface, the bond of said particles to said base compound and first binder being ensured by a second binder wetting said particles when contacted therewith and being compatible with said first binder. These prior patent publications described also that said base compound is in the form of a tape, the second binder entirely coats the particles and the thus coated particles are dispersed within said base tape. There has been described also that such particles preferably consist of beryllium or corundum crystals and have a particle size from one tenth to one millimeter. There has been further described that the second binder comprises epoxy resins, polyester resins, acrylic resins, methacrylic resins, polyvinyl butyral and inorganic binders added to chlorinated rubber.

It is therefore an object of this invention to provide a further improved prefabricated road marking material, having an upper surface and a plurality of upwardly turned pointed hard particles partially extending outwardly from said surface, the new material providing unexpected sharp improvements in anti-skid, wear resistance and high visibility properties.

BRIEF SUMMARY OF THE INVENTION

According to the improvement of the invention, there is provided a road surface marking material, principally in tape form and adapted to be applied and adhesively secured to a road surface, according to current art, and including at least an upper layer the thickness of which is not less than the prevailing portion of the average particle size of hard and pointed particles as above indicated, the said upper layer consisting of a polymerized resin possessing a high internal molecular cohesion provided by the presence of an oxygen atom, such as of carbonyl, adjacent to a hydrogen exerting an attraction on the electrons of the outer ring of the oxygen (thus providing a hydrogen bond), such polymerized resins including polyamide resins, polyurethane resins and polyterephthalic resins, the said upper layer forming an uninterrupted (except where the said particles are embedded therein) coating for a base layer including a binder and designed for adhesive and permanent connection with a suitably prepared road surface.

In other terms, the present improvement consists of selecting, from the second binders considered by the above-referenced advanced technology and capable of wetting the said particles, a polymerized resin having a very high molecular cohesion, of forming the upper layer of the road marking material with the thus selected binder on a substrate of suitable conventional composition including a rubbery copolymer (such as the composition described in Example 2 of the U.S. Pat. No. 3,399,607), said layer having its thickness equal to or greater than the average dimension of the hard particles, and of fitting such particles in such polymerized resin before the setting thereof, so that the binder, which wets the particles and ensures the bond thereof to the marking material, forms also the upper surface of said material.

It has been found that the anti-skid properties provided by the said hard and pointed particles ensure the most desirable traffic safety and quite balance the skiddish nature of the resinous surface. It has been further found that a greatly improved bond between the particles and the material is ensured: as a matter of fact, it has been found that when a particle has been torn off from a known material as above descirbed, the breaking of the bond occurs between the base compound and the coated particle. By the improvement of the invention, the hard particles are firmly secured in and to the upper polymeric layer, even if not more than half of the particle is embedded therein, and the bond between the layer of the polymeric material and the substrate occurs at the entire interface between the said polymeric and substrate layers. It has been still further found that the presence of said hard particles at the upper face of the upper layer provides an unexpectedly efficient protection of said layer against wear even if the marked road is subject to the most severe traffic.

According to a non-critical but advantageous feature of the invention, the provision of a suitable amount of pointed hard particles in the upper polymeric layer is complemented by the provision of an additional amount of tiny particles of substantially hard nature, such as micronized quartz, said latter tiny particles providing a great improvment in the wear reasistance and the service life of the material.

These and other objects, features and advantages of the invention will be made apparent as this description proceeds, reference being made to the accompanying drawing.

THE VIEWS OF THE DRAWING

FIG. 1 is a diagrammatic fragmentary sectional view of the upper layer of a material improved by applying the principle of ensuring anti-skid properties by causing spaced hard particles to extend upwardly above the upper otherwise smooth and planar face of the material;

FIG. 2 is a greatly enlarged fragmentary sectional view of the essential upper part of a material according to the invention;

FIG. 3 similarly illustrates a modified embodiment of the material;

FIG. 4 similarly illustrates a material including hard and anti-skid particles and optical components; and FIG. 5 is a graph wherein the results of wear tests, carried out on various compositions and materials, are plotted.

DETAILED DESCRIPTION OF THE PREFERRED EMBODIMENT

FIG. 1 corresponds to FIG. 4 of the above-referenced patent publications (such as French Pat. No. 2,097,941) and it has been copied therefrom for visualizing the essential concepts and the properties of a road marking material produced according to the known advanced technology referred to above. The greatly prevailing area (up to 90 percent and even more) of the exposed surface of the marker, laid on and secured to a road surface (not shown) consists of a smooth, planar and nearly uniform surface S of a layer of a material M, made of a wear resisting composition and having high visibility properties. As is well known to those skilled in the art, such high visibility properties depend from a plurality of factors, and not only from a suitable pigmentation. More particularly an efficient marking, such as a lane dividing strip or similar traffic regulating sign, is required to remain highly visible even after long use and to have little or no receptivity for dirt and the dark rubber particles resulting from vehicle tire wear and frictional stresses. Therefore, such surface S and the material M which forms said surface must be non-porous and capable of constantly forming a smooth, non-porous and planar face during its progressive wear at least for part of its thickness. Unavoidably, a material having such desirable high visibility properties does not have good non-skid properties.

This latter property, that is the ability to provide an excellent frictional resistance to trangential stress T applied by vehicle wheels, is provided by a plurality of spaced pointed small juttings P, the height H of which might be a very few tenths of a millimeter, provided that such points P are made of hard material and that they are firmly secured to the mterial M to resist the stress T. Such stress can be exceedingly violent for examples when a vehicle is braked to an emergency stop or subject to intense centrifugal forces. Such points P are formed by the upwardly extended portions of hard particles the remaining portions of which are embedded in the material M, below the plane defined by the surface S.

The resistance to the shear force applied in direction T (for example) is provided by the concurrence of three factors: (a) the depth to which the particles are embedded, that is the ratio between their outwardly extended portions and their embedded portions, (b) the strength and the coherence of the material M, and (c) the strength of the bond or adhesion between the particles and the mass. It has been found that the bond between any individual particle and a resin which coats such particle and has wetted the particle when contacted therewith, is very good, while the bond between the coating resin and the binder or binders included in a conventional road marking strip composition can be defective. It is to be noted that such composition necessarily includes pigments, fillers, hardeners and therefore the binder does not form a homogeneous and completely coherent mass.

As shown in FIG. 2, the particles C, such as hard crystals, are embedded in a layer of material M formed by a polymeric resin which has wetted such particles when contacted therewith and which has a high internal molecular cohesion. The thickness of said layer is at least equal to, and preferably greater than, the dimension D of the embedded portions of the particles, such dimension being at least equal to the extension or height H of the particles above the surface S, which latter is essentially formed by said polymeric material which can bind itself to a substrate (not shown) of conventional composition (such as that described in Example 2 of U.S. Pat. No. 3,399,607, or other suitable compositions) at the entire interfacial area between said layer and substrate.

As shown in FIG. 3, above the upper surface S' of the material there are upwardly extended exposed portions of hard particles, to form anti-skid points P, and extremely small points P' formed by tiny particles C' which are applied over or dispersed within the layer. Such tiny particles provide an unexpected protection for the surface S, the wear of which is drastically reduced, even if such tiny particles C' consist of material of hardness less than 7, but not less than 6, on the Mohs' Hardness Scale, such as micronized quartz.

As shown in FIG. 4, the layer of material M embeds, additionally to hard particles C providing the anti-skid points P (and possibly tiny surface protective particles), optical elements adapted to improve nighttime visibility, such as reflex-reflective glass beads O' and/or compound directionally reflective transparent spheres O" having a monolayer of reflective beads thereabove. Such optical elements are known in the art and form no part of this invention, except as to being partially embedded in and firmly secured to a layer M of a polymeric material which has wetted such elements when contacted therewith and which is adapted for interfacial adhesion and bonding with a substrate of at least partially elastomeric nature.

Several tests have been carried out to ascertain the unexpected results of the invention. Such tests have been carried out by actually simulating the behaviour of a marked road under heavy traffic, by rolling heavily loaded conventional vehicle wheels, at different speeds and under various braking and steering conditions, along a circular path covered with a highway pavement on which samples of the road marking material had been adhesively secured. The tests have been performed also in various ambient conditions to simulate hot and cold climates, rain and different weather conditions in general.

Steadily good results have been obtained by a material the upper layer of which consists of polyurethane resin (specifically, use has been made of the commerical resin "Desmodur L" cross-linked with Desmophen 800' manufactured and sold by Farbenfabriken Bayer A. G.) containing 12 percent by weight titanium dioxide. Comparable results have however been obtained by making use of other di- and tri-isocyanates, cross-linked with hydroxy groups including polyesters and polymers, as well as by making use of polyterephthalic resins.

In the graph of FIG. 5 the progressive wear $U$ is plotted as a function of the time in months ($m$) of simulated severe actual service on a highway. Curves A/5 and B/5 refer to materials including an upper layer consisting of the above polyurethane resin to which was added 10 percent by weight of corundum and respectively quartz crystals of an average size of 0.5 mm. Curve C/5 illustrates the resistance to wear of a similar compound, which includes 35 percent by weight quartz crystals (hardness about 6) of nearly microscopic granulation (the commercial "micronized quartz").

The curves D/5, E/5 and F/5 indicate the wear resistance, under like conditions, of a material of known and conventional composition and including a binder of elastomeric nature (the elastoplastic compound described in the French Pat. No. 2,097,941), to which there has been added 10 percent by weight of the corundum particles of the sample of curve A/5 and respectively 10 percent by weight of the quartz particles of the material of curve B/5, and 35 percent by weight of the micronized quartz of the material of curve C/5.

From a comparison of te curves of the graph the importance of embedding and securing the hard particles in a continuous layer of a polymeric resin having both the properties of wetting the particles when contacted therewith and of having a very high internal molecular cohesion, are evident. The resistance to wear of the material of the invention, even if provided with anti-skid particles of quartz (curve B/5), the hardness of which is comparable with that of some fillers of the rubbery compounds of tires and that of sand and powdery materials which can be found on highways, is sharply higher than that of a conventional material including particles of the hardest material, that is corundum crystals (curve D/5).

The non-skid properties of the materials of curves A/5 and B/5 were comparable with those of the materials of curves D/5 and respectively E/5 and F/5, as measured on new and freshly laid down material. As soon as the materials were subject to a wear over 150 to 200 microns (the scale U of FIG. 5) a substantial drop was experienced in the comparison samples of curves D/5 and E/5. It has been found that such drop is promoted by the fact that as soon as the wear of surface S leads to an uncovering of about one third of the height of the particles, most such particles are torn off from material including an elastomeric binder and are lost for anti-skid, while in the material consisting of the above described polymeric resin, most particles which, during the progressive wear of the material, have been about half exposed over the surface S, are still firmly bound to the material and efficiently acting as anti-skid elements. Therefore in the material of the invention the density or population of the spaced anti-skid elements does not substantially decrease during wear, until actual destruction of the material upper layer.

Further, a sharp improvement has been experienced in tests performed by simulating the dynamic action of vehicles travelling at high but currently attainable speed. The results of said tests, confirmed by actual experimentation on a highway, have shown that the vehicle speed has a marked influence in tearing off particles from the material. This aspect of the behaviour of road surface marking materials has apparently not been taken into account by the prior art.

I claim:

1. A marker for use on a roadway pavement so as to form a traffic-regulating indicium, comprising a first layer having a first surface adapated to face away from a roadway pavement, said first layer including an elastomeric binder; a second highly light-reflective layer having a second surface adapted fo face away from the roadway pavement and another surface juxtaposed with said first surface, said second layer including a resin of the group consisting of polyamide resins, polyurethane resins and polyterephthalic derivative resins, and said elastomeric binder being selected so as to be compatible with said resin and being a member of the group consisting of elastomeric binders suitable as constituents of traffic-regulating indicia, said second layer being bonded to said first layer over substantially the entire interfacial area between said first and other surfaces by bonds formed due to the compatibility of said resin and binder, and said second surface including spaced first surface sections and subtantially smooth, substantially planar second surface sections constituting a substantial part of said second surface and which are exposed for the reflection of light from said second surface; and a plurality of particles bonded to said second layer and projecting outwardly therefrom at said first surface sections, said particles having a minimum hardness of about 6 on the Mohs Hardness Scale and including pointed end portions outwardly of said second surface for imparting good anti-skid properties to said second layer, and said second layer having a thickness no greater than about the average dimension of said particles and comprising a minimum of about 10 percent by weight of said particles, said particles being securely bonded to said second layer due to the wetting and the resultant intimate contacting of said particles by said resin when said particles are contacted with said resin prior to setting of the latter and due to the nature of said resin which results in the presence of high-strength bonds formed by the attraction of hydrogen atoms for the electrons of the outer electron rings of neighboring oxygen atoms.

2. A marker as defined in claim 1, wherein said particles comprise crystals of average dimension of about 0.5 millimeter.

3. A marker as defined in claim 2, wherein said crystals comprise quartz.

4. A marker as defined in claim 2, wherein said crystals comprise corundum.

5. A marker as defined in claim 1, wherein said particles comprise tiny crystals of micronized granulation.

6. A marker as defined in claim 5, wherein said particles comprise commercial micronized quartz.

7. A marker as defined in claim 2, wherein said second layer comprises about 10 percent by weight of said crystals.

8. A marker as defined in claim 5, wherein said second layer comprises about 35 percent weight of said tiny crystals to impart good wear resistance to said second layer.

9. A marker as defined in claim 1, wherein said particles project outwardly from said second surface for a distance corresponding to at most about one-half of the dimensions of the respective particles as measured in a direction substantially normal to said second surface.

10. A marker as defined in claim 1, wherein said second layer comprises at most about 35 percent by weight of said particles.

11. A marker as defined in claim 1, wherein said binder is a butadiene-based binder.

12. A marker as defined in claim 1, wherein said binder is a butadieneacrylonitrile copolymer.

13. A marker as defined in claim 12, wherein said polyvinyl chloro-acetate copolymers are maleic modified copolymers.

14. A marker as defined in claim 1, wherein said first layer is in the form of a tape.

15. A marker as defined in claim 1, wherein said first layer is adapted to be adhesively secured to the roadway pavement.

16. A marker as defined in claim 1, wherein the continuity of said second layer is interrupted substantially only by said particles.

* * * * *